US012671447B2

(12) United States Patent
Raghavan et al.

(10) Patent No.: US 12,671,447 B2
(45) Date of Patent: Jun. 30, 2026

(54) TUNABLE FILTER ARRANGEMENT

(71) Applicant: SKYWORKS SOLUTIONS, INC., Irvine, CA (US)

(72) Inventors: Anand Raghavan, Middleton, WI (US); David Richard Pehlke, Westlake Village, CA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 328 days.

(21) Appl. No.: 18/373,335

(22) Filed: Sep. 27, 2023

(65) Prior Publication Data

US 2024/0120953 A1      Apr. 11, 2024

Related U.S. Application Data

(60) Provisional application No. 63/413,720, filed on Oct. 6, 2022.

(51) Int. Cl.
H04B 1/00          (2006.01)
H04B 1/44          (2006.01)

(52) U.S. Cl.
CPC ............. H04B 1/0064 (2013.01); H04B 1/44 (2013.01)

(58) Field of Classification Search
CPC ................................ H04B 1/0064; H04B 1/44
See application file for complete search history.

(56) References Cited

U.S. PATENT DOCUMENTS

| | | | |
|---|---|---|---|
| 10,257,119 B2 | 4/2019 | Wloczysiak et al. | |
| 10,965,021 B2 | 3/2021 | Wloczysiak | |
| 2013/0244591 A1* | 9/2013 | Weissman .............. | H03H 9/462 |
| | | | 455/77 |
| 2014/0342678 A1 | 11/2014 | Khlat | |
| 2018/0159562 A1 | 6/2018 | Bauder | |
| 2019/0181825 A1 | 6/2019 | Schmalzl et al. | |
| 2020/0328729 A1* | 10/2020 | Jo ......................... | H03H 11/28 |
| 2021/0184346 A1 | 6/2021 | Wloczysiak | |
| 2022/0029643 A1 | 1/2022 | Oh et al. | |
| 2023/0088469 A1 | 3/2023 | Raghavan | |

FOREIGN PATENT DOCUMENTS

| | | |
|---|---|---|
| WO | 2019173101 A1 | 9/2019 |
| WO | 2020141941 A1 | 7/2020 |

OTHER PUBLICATIONS

International Search Report and Written Opinion from corresponding International Application No. PCT/US2023/033779 dated Jan. 24, 2024.

* cited by examiner

*Primary Examiner* — Ayodeji O Ayotunde
(74) *Attorney, Agent, or Firm* — Lando & Anastasi, LLP

(57) ABSTRACT

According to the present disclosure there is provided a front-end module comprising a first antenna port and a second antenna port, a first filter forming a first signal path with the first antenna port and a second filter forming a second signal path with the second antenna port, the first or second filter being an adjustable filter. There is also provided a wireless device.

20 Claims, 12 Drawing Sheets mXn DL MIMO nXm UL MIMO

TUNABLE FILTER ARRANGEMENT

CROSS-REFERENCE TO RELATED APPLICATIONS

This application claims priority under 35 U.S.C. § 119(e) to U.S. Provisional Patent Application Ser. No. 63/413,720, titled "A TUNABLE FILTER ARRANGEMENT," filed Oct. 6, 2022, the entire content of which is incorporated herein by reference in its entirety for all purposes.

BACKGROUND

Field

Aspects of the present disclosure relate to the field of wireless communication devices and, more particularly, to front-end architectures configured to process multiple frequency bands.

DESCRIPTION OF THE RELATED TECHNOLOGY

In wireless applications, wireless communication devices typically include components in a front-end module that are configured to filter and/or amplify received radio-frequency (RF) signals. The RF signals can be cellular signals, wireless local area network (WLAN) signals, or the like. The front-end module can be configured to direct these signals to appropriate filters, amplifiers, and/or downstream modules for processing.

SUMMARY

According to one aspect of the present disclosure there is provided a front-end module comprising a first antenna port and a second antenna port, a first filter forming a first signal path with the first antenna port and a second filter forming a second signal path with the second antenna port, the first or second filter being an adjustable filter.

In one example the first filter is a bandpass filter.

In one example the second filter is a tuneable filter. In one example the second filter is a tuneable bandpass filter. Optionally the bandpass filter has a passband configured to pass transportation channels.

In one example first filter is a notch filter having a stop-band and a pass-band. Optionally the notch filter is configured to be tuned and/or switched on or off, and/or optionally the second filter is a bandpass filter having a passband within the stop-band of the notch filter. Optionally the bandpass filter has a passband configured to pass transportation channels. Optionally the bandpass filter has a passband of 5855-5925 Mhz.

In one example the adjustable filter is manually adjusted.

In one example the adjustable filter is electronically adjusted. In one example the front-end module further comprises a first power amplifier. Optionally the power amplifier is connected to the first and second signal paths via a switch. Optionally the front-end module further comprises a second power amplifier. Optionally the first power amplifier is connected to the first signal path, and the second power amplifier is connected to the second signal path. Optionally the first and second signal paths are each connectable to at least one of the power amplifiers. Optionally each of the first and second signal paths are connectable to either the first or second power amplifiers. Optionally the second power amplifier is configured to transmit transportation band signals.

In one example the front-end module further comprises a first low-noise amplifier. Optionally the first low-noise amplifier is connectable to either the first or second filter. Optionally the first low-noise amplifier is an active splitter low noise amplifier. Optionally the front-end module further comprises a second low-noise amplifier. Optionally the first low-noise amplifier is connected to the first filter, and the second low-noise amplifier is connected to the second filter. Optionally the first and second low-noise amplifiers are each connectable to either the first or second filters. Optionally the second low-noise amplifier is configured to process transportation band signals.

In one example the front-end module further comprises a third filter forming a third signal path with the second antenna port, wherein the second filter is a receive filter, and the third filter is a transmit filter. Optionally the second and third filters are connected to an antenna switch module, ASM, wherein the ASM is connected to the second antenna port. Optionally the second and third filters are tuneable filters.

In one example a fourth filter forms a fourth signal path with the first antenna port, wherein the first filter is a receive filter, and the fourth filter is a transmit filter. Optionally the first filter is a tuneable filter. Optionally the fourth filter is a tuneable filter. Optionally the first and fourth filters are connected to an ASM, wherein the ASM is connected to the first antenna port.

According to another embodiment there is provided a wireless device comprising a first antenna, a second antenna, and a radio-frequency module, the radio-frequency module including a front-end configuration comprising a first antenna port coupled to the first antenna, a second antenna port coupled to the second antenna, a first filter forming a first signal path with the first antenna port, and a second filter forming a second signal path with the second antenna port, the first or second filter being an adjustable filter.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labelled in every figure. In the figures.

DETAILED DESCRIPTION

Figure 1:
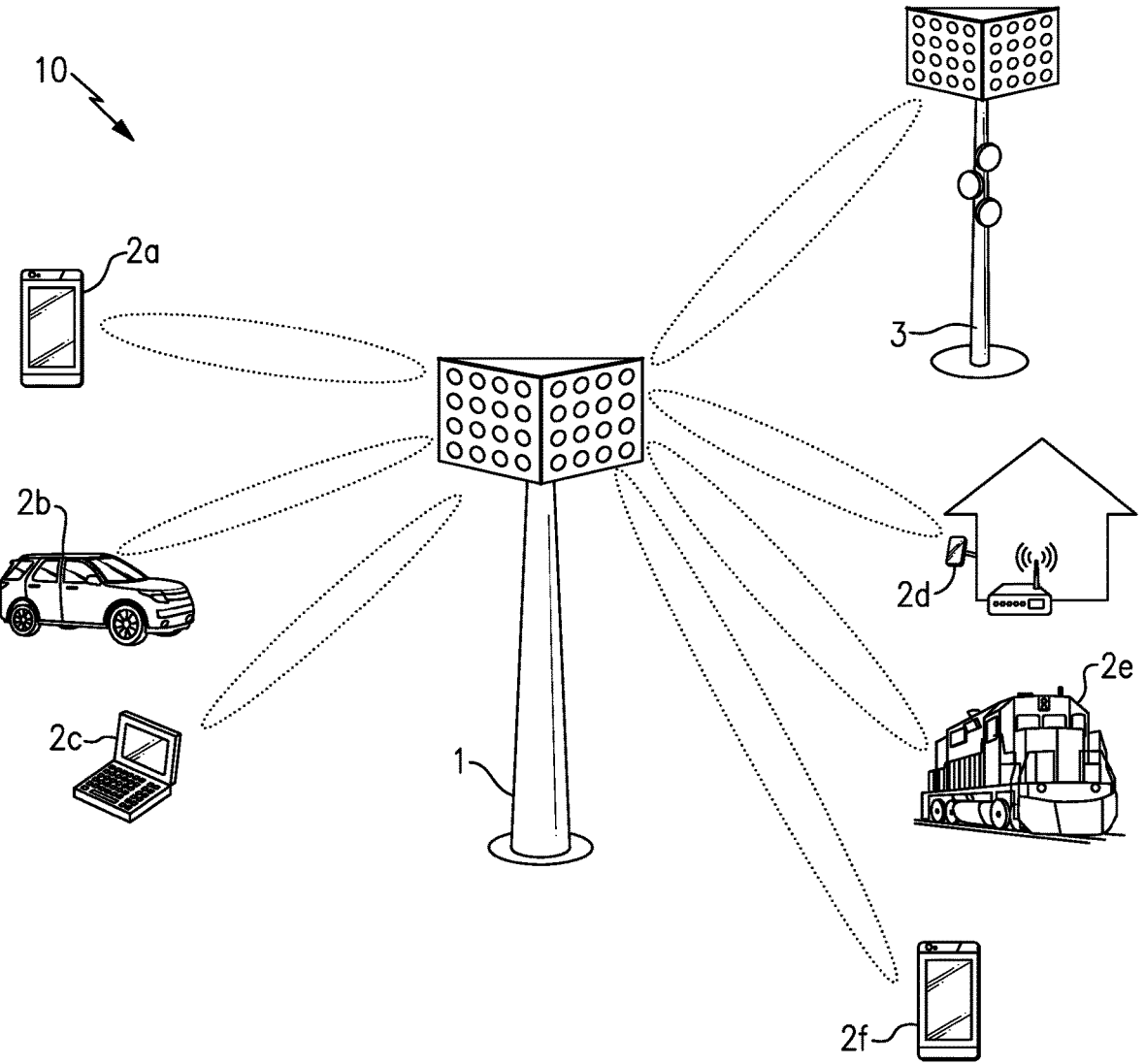
FIG. 1 is a schematic diagram of one example of a communication network.

Aspects and embodiments described herein are directed to a front-end configuration having a first antenna port and a second antenna port, a first filter forming a first signal path with the first antenna port, and a second filter forming a second signal path with the second antenna port, the first or second filter being an adjustable filter.

It is to be appreciated that embodiments of the methods and apparatuses described herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

The following detailed description of certain embodiments presents various descriptions of specific embodiments. However, the innovations described herein can be embodied in a multitude of different ways, for example, as defined and covered by the claims. In this description, reference is made to the drawings in which like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet-of-Things (NB-IOT), Vehicle-to-Everything (V2X), and High Power User Equipment (HPUE).

3GPP introduced Phase 1 of fifth generation (5G) technology in Release 15, and introduced Phase 2 of 5G technology in Release 16 (targeted for 2019). Subsequent 3GPP releases further evolved and expanded 5G technology. 5G technology is also referred to herein as 5G New Radio (NR). 5G NR supports or plans to support a variety of features, such as communications over millimeter wave spectrum, beam forming capability, high spectral efficiency wave-forms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of RF systems, including, but not limited to, RF systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, and a second mobile device 2f.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of technologies, including, for example, 4G LTE, 5G NR, and wireless local area network (WLAN), such as Wi-Fi. Although various examples of communication technologies have been provided, the communication network 10 can be adapted to support a wide variety of communication technologies including for example, dedicated short-range communications (DSRC), cellular vehicle-to-everything (C-V2X), and other transportation communications protocols.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communication with a base station using one or more of 4G LTE, 5G NR, and Wi-Fi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed Wi-Fi frequencies).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least Gbps and a minimum of 100 Mbps for each user. Ultra-reliable low latency communications (uRLLC) refers to technology for communication with very low latency, for instance, less than 2 milliseconds. Ultra-reliable low latency communications (uRLLC) can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
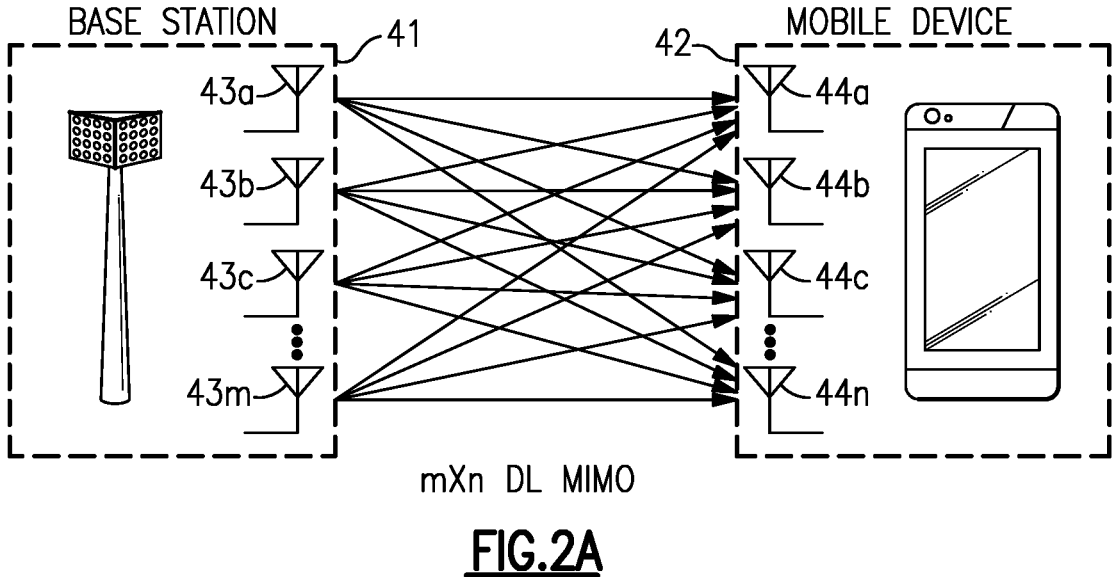
FIG. 2A is a schematic diagram of one example of a downlink channel using multi-input and multi-output (MIMO) communications.
Figure 2B:
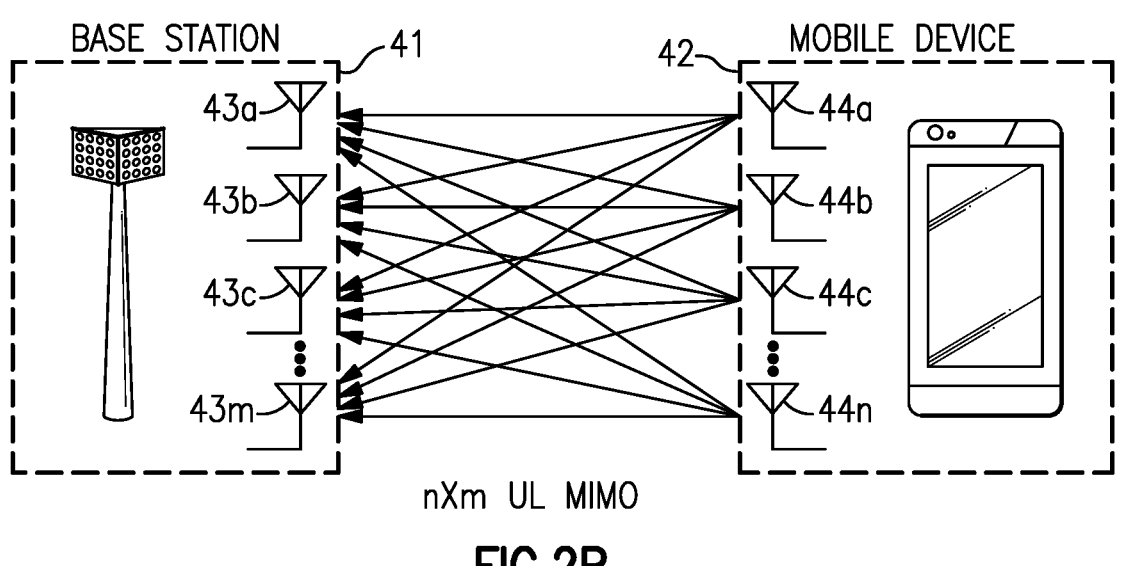
FIG. 2B is schematic diagram of one example of an uplink channel using MIMO communications.

FIG. 2A is a schematic diagram of one example of a downlink channel using multi-input and multi-output (MIMO) communications. FIG. 2B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 2A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 2A illustrates an example of M×N DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 2B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 2B illustrates an example of N×M UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3:
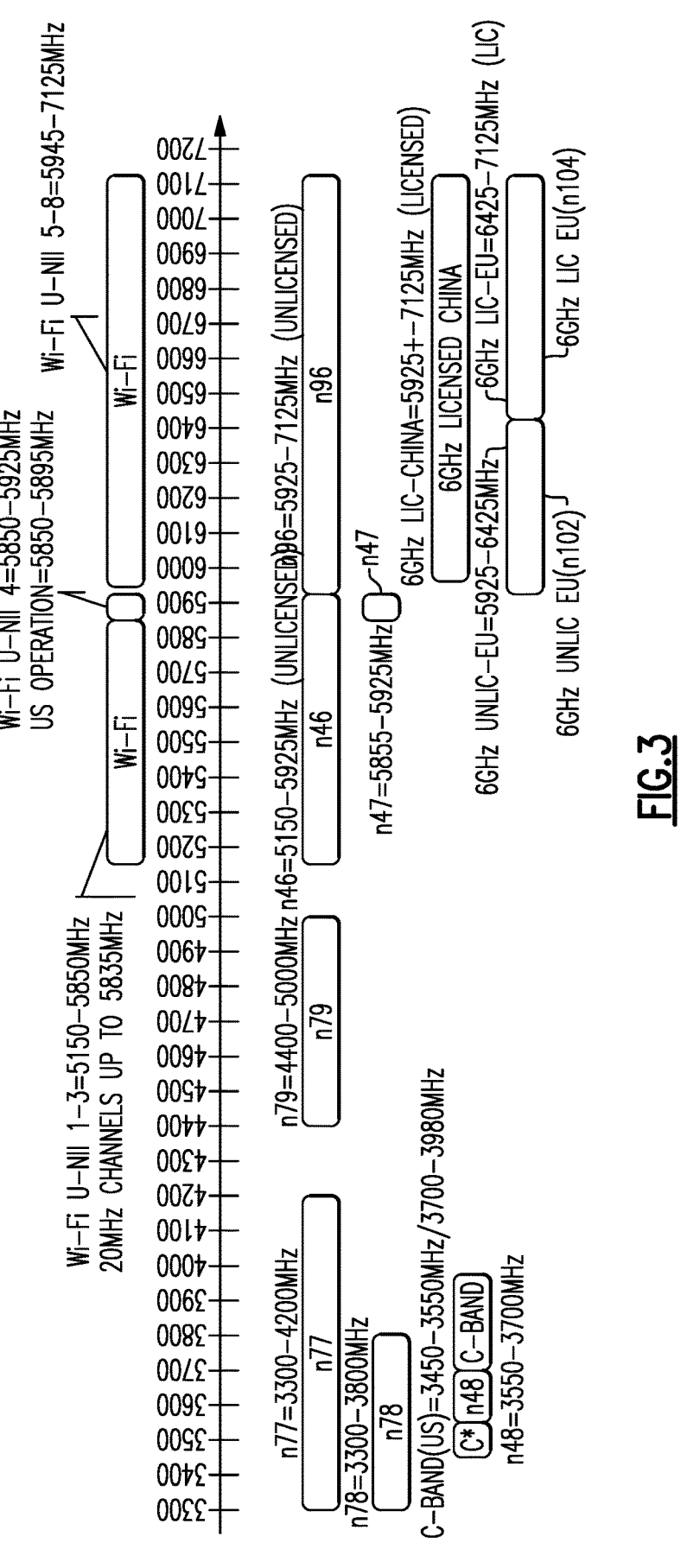
FIG. 3 is a diagram showing the radio frequency (RF) spectrum.

RF systems communicate using multiple communications standards, for instance, 4G LTE, 5G, and/or Wi-Fi. One communication standard can specify communication over a frequency band that is relatively close in proximity to and/or overlapping in frequency with a frequency band of a different communication standard. FIG. 3 shows the RF spectrum, and each of the overlapping bands of interest in the present application.

Cellular bands have recently been defined for operation in the 6 GHz spectrum, both as licensed and unlicensed bands. The licensed Wi-Fi in the 6 GHz spectrum may vary from region to region, for example 6 GHz Wi-Fi is licensed in a different band to EU licensed Wi-Fi. Licensed and unlicensed Wi-Fi bands are shown in FIG. 3, with the Wi-Fi in the 5 GHz spectrum shown as well as the licensed and unlicensed Wi-Fi shown in the 6 GHz spectrum.

Cellular Vehicle-to-Everything (C-V2X) operation for public safety usage has also recently been defined in the spectrum adjoining the 6 GHz spectrum. There are also other transportation bands such as Dedicated short-range communications (DSRC), which operate in the same frequency range as C-V2X. It will be appreciated that in arrangements described herein, that although reference may only be made to C-V2X, other transportation bands may be transmitted and/or received using the same arrangements. C-V2X operates in the n47 band, 5855-5925 MHz. As shown in FIG. 3, n47 is adjacent to the 6 GHz unlicensed EU (102) Wi-Fi band, and adjacent to the 6 GHz Licensed China band. Therefore, there is a very small separation between the C-V2X band and the adjacent Wi-Fi bands.

The n47 band is also located between the unlicensed cellular band, n46, and the unlicensed band n96. As shown in FIG. 3, n46 operates between 5150-5925 MHz and n96 operates between 5925-7125 MHz. Therefore, there is an overlap between the unlicensed cellular bands, and the C-V2X band, which may result in interference which degrades the C-V2X signal.

Therefore, there is a need to develop circuit and RFFE architectures that can efficiently and cost-effectively allow the bands/modes as shown in FIG. 3 to operate, while providing for some level of coexistence performance. Simultaneous transmit/receive between multiple bands or protocols is important to ensure that C-V2X can be operated alongside Wi-Fi which is crucial in vehicular wireless communication modules, wherein the safety of the vehicle is reliant on an uninterrupted C-V2X operation. This application describes architectures in which all of the modes may be supported.

It will be appreciated that in the arrangements described herein, the front-end module has been described as having two antenna ports, however the front-end module may be located within a front-end system which may have another number of antenna ports, such as four. In such a case, the circuitry of the front-end module for the second pair of antenna ports may be the same or equivalent to the circuitry described above for the first two antenna ports. It will be noted that the figures show the circuitry for the second pair of antenna ports, and thus show the entire front-end system.

Figure 4:
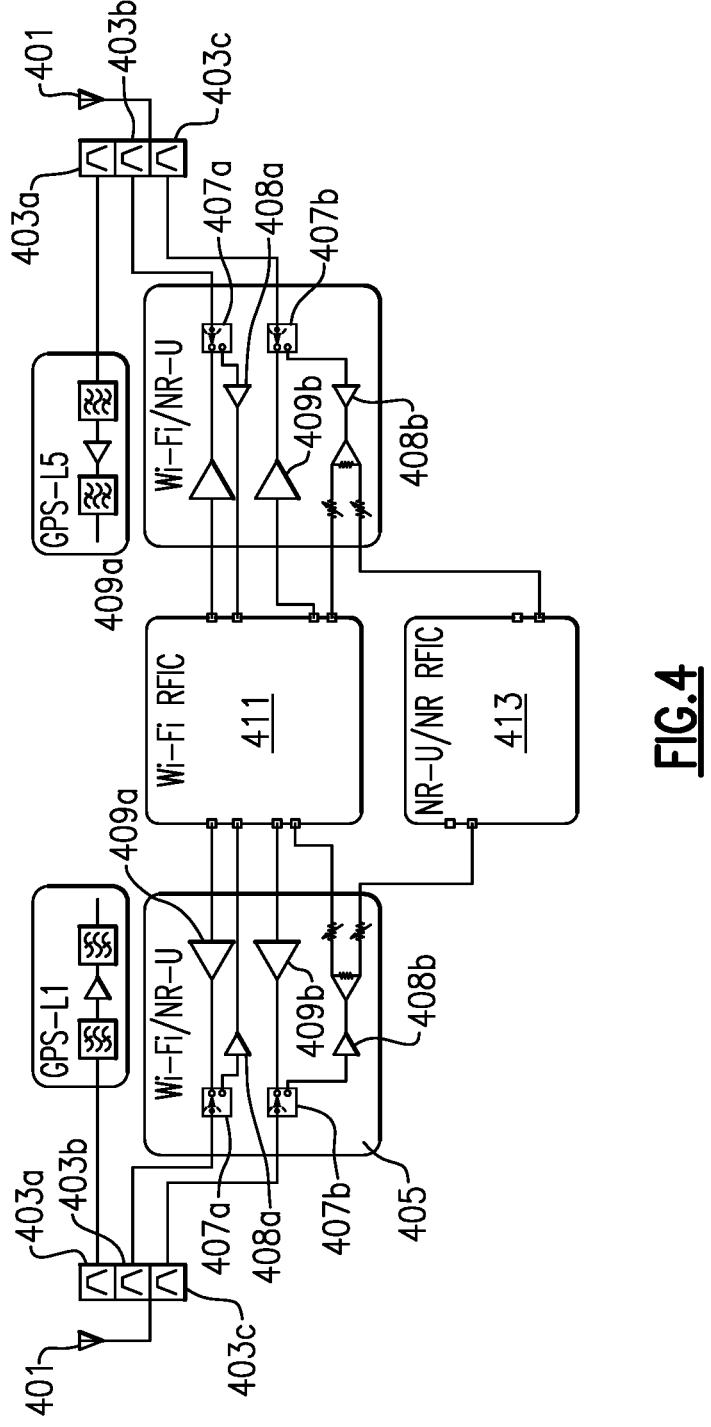
FIG. 4 is a schematic diagram of a radio frequency system including a front-end module.

FIG. 4 illustrates a conventional RF front-end module located within a RF system, in which there is no 6 GHZ or C-V2X support. The RF front-end comprises one or more modules, and one or more filters as will be described herein.

As shown, there is an antenna port, 401, which is connected to three passband filters, 403a, 403b and 403c. The antenna port 401 forms a single signal path with the three filters 403a, 403b and 403c. The first passband filter 403a allows signals in a first range, for example a signal within the GPS L1 band, to pass through the filter. The signals which pass through the first passband filter are then processed in a GPS L1 module, in this example.

The second passband filter 403b allows signals in a second range, for example a signal in the 2.4 GHz band, to pass through the filter. The signals within the 2.4 GHz are processed in a RF module 405, which is arranged such that the second filter 403b is connected to a power amplifier 409a via a switch 407a. The switch 407a can switch between the power amplifier 409a and a low-noise amplifier 408a, therefore the antenna can transmit and receive within the 2.4 GHz range.

The third passband filter 403c allows signals in a third range, for example a signal in the GHz/6 GHz band, to pass through the filter. The signals within the 5 GHz/6 GHz are processed in the RF module 405, which is arranged such that the third filter 403c is connected to a power amplifier 409b via a switch 407b. The switch 407b can switch between the power amplifier 409b and a low-noise amplifier (LNA) 408b, therefore the antenna can transmit and receive within the GHz/6 GHz range. A post-LNA splitter is connected to the low noise amplifier 408b. The post-LNA splitter supports downlink concurrency for 5 GHz Wi-Fi and 5 GHz NR-U receiver paths.

The 2.4 GHz power amplifier 409a and low-noise amplifier 408a are connected to a Wi-Fi radio frequency integrated circuit (RFIC) 411, where the RFIC will herein be referred to as transceivers, where the Wi-Fi transceiver 411 is also connected to the 5 GHz power amplifier 409b and the post-LNA splitter, such that the 5 GHz Wi-Fi receiver path is connected to the Wi-Fi transceiver. The 5 GHz NR-U receiver path is connected to an NR-U transceiver 413.

Therefore, as shown in FIG. 4, and described herein, the conventional RF front-end provides no 6 GHZ or C-V2X support. Nor is there the ability to transmit and receive 5 GHz Wi-Fi and 5 GHz NR-U concurrently as there is one common path to the antenna port 401.

Figures 5A, 5B:
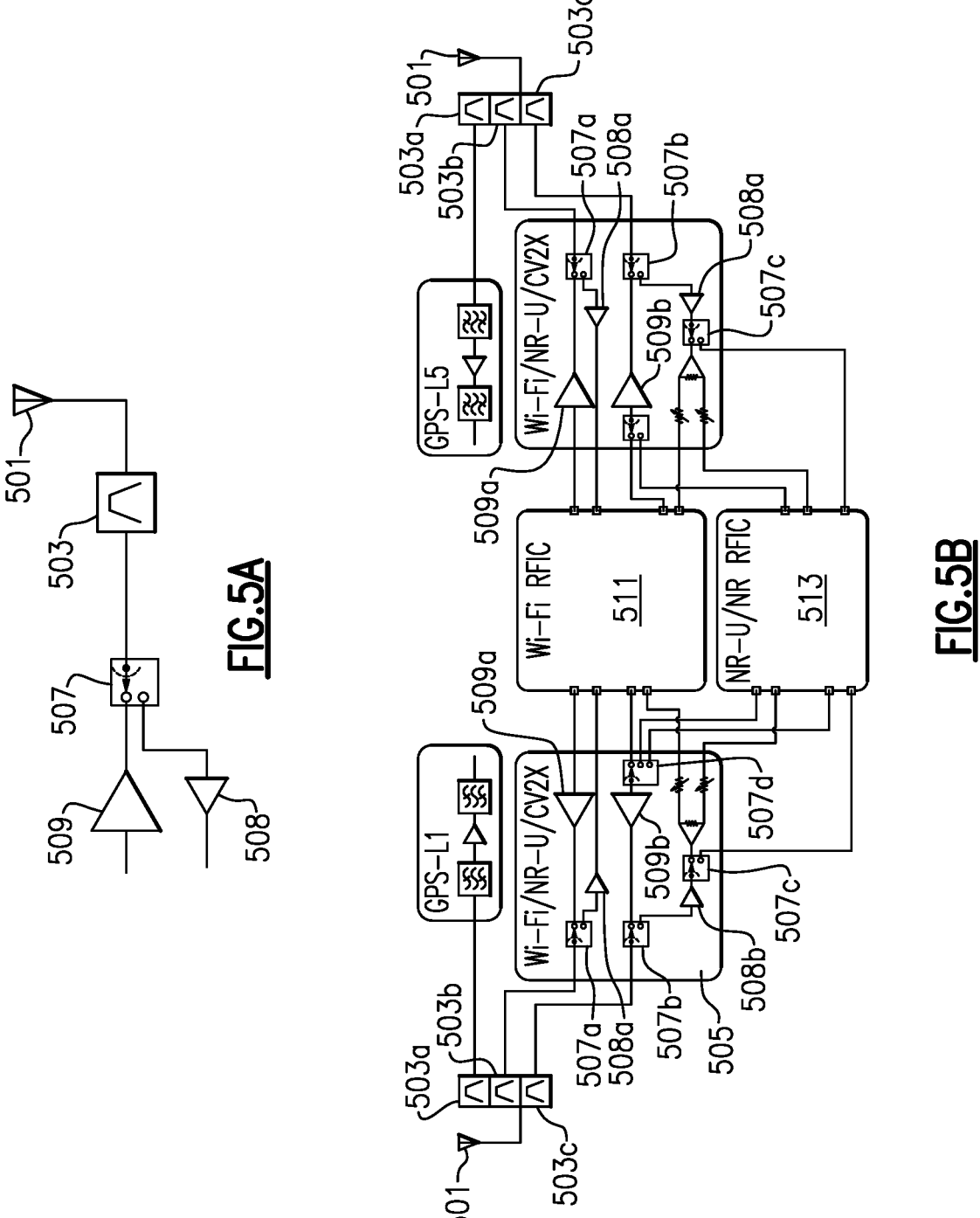
FIG. 5A is a schematic diagram of an antenna and filter configuration.
FIG. 5B is a schematic diagram of a radio frequency system including a front-end module and the antenna and filter configuration of FIG. 5A.

FIG. 5A illustrates a schematic of a filter and switch arrangement in which C-V2X (n47) and 6 GHz Unlicensed band (n96) are supported. FIG. 5B shows the arrangement of FIG. 5A incorporated into an RF front-end. The RF front-end is shown in a RF system, however as described herein, the invention will be described in relation to the RF front-end. As shown in FIGS. 5A and 5B, the RF front-end comprises an antenna port 501 which is connected to three passband filters 503a, 503b, and 503c. As described in relation to FIG. 4, the antenna port 501 forms a single signal path with the three filters 503a, 503b and 503c. The first passband filter 503a allows signals in a first range, for example a signal within the GPS L1 band, to pass through the filter. The signals which pass through the first passband filter are then processed in a GPS L1 module, in this example.

The second passband filter 503b allows signals in a second range, for example a signal in the 2.4 GHz band, to pass through the filter. The signals within the 2.4 GHz are processed in a RF front-end module 505, which is arranged such that the second filter 503b is connected to a power amplifier 509a via a switch 507a. The switch 507a can switch between the power amplifier 509a and a low-noise amplifier 508a, therefore the antenna can transmit and receive within the 2.4 GHz range. It will be appreciated that filters 503a and 503b, and GPS L1 module, may be present in all of the arrangements described herein, however they are not referred to explicitly in the following arrangements. FIGS. 6 to 12 show that these filters and module may be present, and it will be understood that the filters and module have the same features as described in relation to FIGS. 4 and 5B.

In the arrangement of FIGS. 5A and 5B, the third filter 503c is a passband filter which allows signals in a third range to pass through. In this arrangement, the third filter has a band pass of 5150-7125 MHz. Therefore, signals within this range may be transmitted and received by the antenna. The passband filter 503c therefore enables 5 GHz Wi-Fi Band (n46) to pass through, as well as C-V2X (n47) and 6 GHz unlicensed band (n96) to pass through.

The passband filter 503c is connected to a switch 507b which is configured to switch between a power amplifier 509b and a low-noise amplifier 508b. The power amplifier 509b is configured to be shared between the 5 GHz and 6

GHz Wi-Fi transmitter paths, as well as the C-V2X transmitter path. The power amplifier 509b is connected to a switch 507d configured to switch between the 5 GHz/6 GHz outputs on the Wi-Fi transceiver 511, the 5 GHz/6 GHz outputs on the NR-U/NR transceiver and the C-V2X output (5.9 GHz) on the NR-U/NR transceiver 513.

Therefore, as described above, the power amplifier 509b is shared between Wi-Fi and cellular use, i.e., NR-U use. Therefore, the cellular band may operate and has a supported uplink via use of the Wi-Fi power amplifier.

The low-noise amplifier 508b is connected to a switch 507c. The switch 507c is configured to switch between a first signal path which is connected to the C-V2X input on the NR-U/NR transceiver 513, and a post-LNA splitter which splits the second path from the switch 507c into two signal paths, one of which is connected to the 5/6 GHz Wi-Fi input on the Wi-Fi transceiver 511, and the other of which is connected to the 5/6 GHz NR-U input on the NR-U/NR transceiver 513.

The RF front-end of FIGS. 5A and 5B has the advantage of being able to support C-V2X operation. As described above, the downlink portion of the RF front-end has separate paths for the C-V2X and the Wi-Fi and NR-U. However, as the C-V2X is separated by a switch, this results in C-V2X not being supported simultaneously with the other bands. Therefore, there is no C-V2X and Wi-Fi/NR-U coexistence possible.

Figures 6A, 6B:
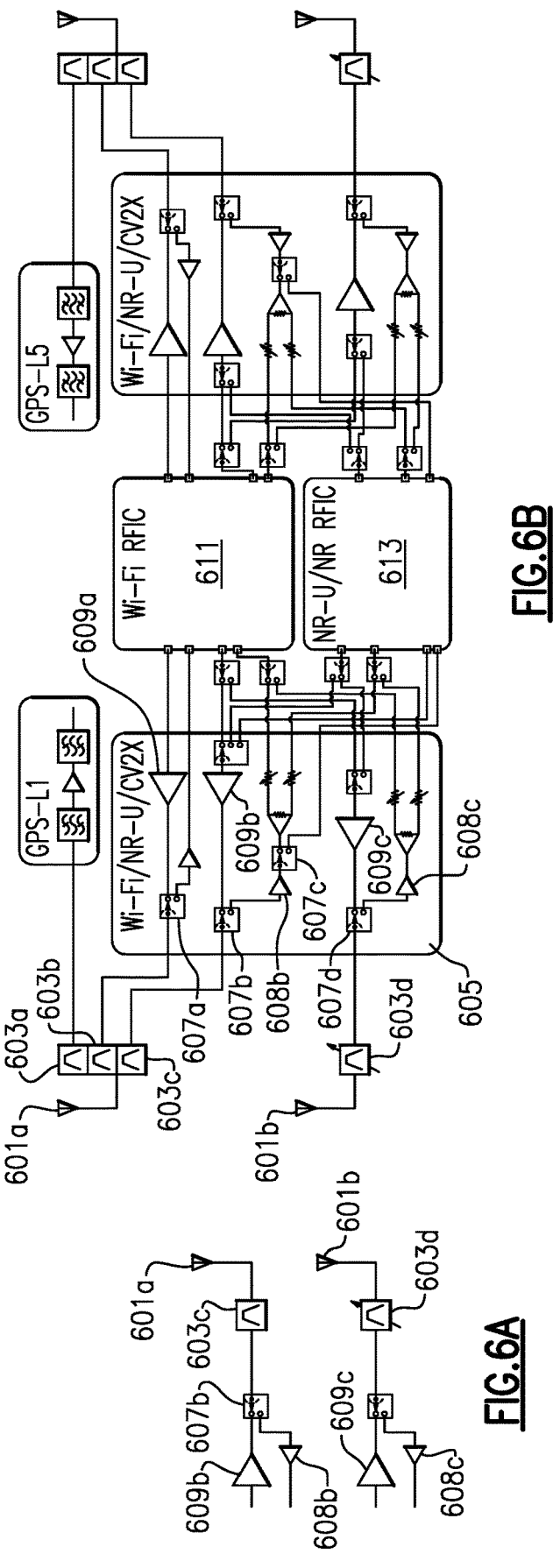
FIG. 6A is a schematic diagram of an antenna and filter configuration according to aspects of the present disclosure.
FIG. 6B is a schematic diagram of a radio frequency system include a front-end module and the antenna and filter configuration of FIG. 6A.

FIGS. 6A and 6B illustrate a schematic of a first arrangement. FIG. 6A shows a switch and filter arrangement of the RF front-end, comprising a tuneable filter. FIG. 6B shows the RF front-end in an RF system. The arrangement of FIGS. 6A and 6B provides a solution for adjacent TDD bands.

As illustrated in FIG. 6A, the RF front-end comprises two antenna ports. It will be noted that when the RF system is used in a wireless device, the first antenna port will be connected to a first antenna, and the second antenna port will be connected to a second antenna. The first antenna port 601a is connected to a filter 603c. The filter 603c may be a passband filter, where the band pass of the filter may be such that 5 GHz Wi-Fi, 5 GHz NR-U and C-V2X have frequencies within the passband of the filter 603c. For example, the passband of filter 603c may be 5150-5925 MHz. The filter 603c is connected to a transmit-receive switch 607b which is configured to switch between a power amplifier 609b and a low-noise amplifier 608b. The power amplifier is connected to a 5 GHz/6 GHz output on the Wi-Fi transceiver 611, a 5 GHz/6 GHz output on the NR-U/NR transceiver 613 and a 5.9 GHz output on the NR-U/NR transceiver via a switch. Therefore, in this arrangement, 5 GHz Wi-Fi, 5 GHz NR-U and C-V2X downlink concurrency is supported. However, as the power amplifier is connected to each output on the transceivers this results in GHz Wi-Fi, 5 GHz NR-U and C-V2X not being able to be transmitted simultaneously.

The low-noise amplifier 608b is connected to the 5 GHZ Wi-Fi input on the Wi-Fi transceiver 611, and to the 5 GHz NR-U and C-V2X inputs on the NR-U/NR transceiver 613 via a switch 607c. The switch 607c is configured to switch between a first and second path. The first path is connected to a post-LNA splitter which connects the path to the 5 GHZ Wi-Fi and 5 GHz NR-U inputs. The 5 GHz Wi-Fi and 5 GHz NR-U uplink are therefore not able to coexist. The second path from the switch 607c is conned to the C-V2X input on the transceiver. Therefore, there is no coexistence possible for the uplink of C-V2X and 5 GHz Wi-Fi/NR-U.

The second antenna port 601b is connected to a filter 603d. The filter 603d is an adjustable bandpass filter such that the passband of the filter may be varied. In this example the filter is a tuneable filter with a tuneable corner frequency, where the passband may be varied over a range of 5945 to 7125 MHz. However, it will be appreciated that tuneable filters with different passband ranges may be used. The passband of the filter 603$d$ may be varied to support different regions of licensed and unlicensed 6 GHz. The tuneable filters described herein may be any suitable manually or electrically tuneable filter.

As described, the first filter 603$c$ has a passband of 5150-5925 MHz, and the second filter 603$d$ may have a passband between 5945 and 7125 MHz. This results in at least a 20 Mhz separation, 5925 to 5945 MHz, between the passbands of the two filters. This results in a protection of a C-V2X band where the C-V2X band, n47, is 5855-5925 MHz. Therefore, frequencies within the passband of the second filter will have negligible interference with the C-V2X band. This is advantageous as the C-V2X band is a safety service, and the operation of C-V2X band without being interfered with is important.

As described, the adjustable filter 603$d$ has a tuneable corner frequency. Therefore, the passband of the filter may be adjusted to support different regions of licensed and unlicensed bands. For example, the unlicensed n96 band has a frequency range of 5925-7125 MHz and therefore the filter can be adjusted to have a passband of 5945-7125 MHz, i.e., its maximum range of frequency being passed through the filter. The 6 GHz China licensed band has a frequency range of 5925-7125 MHz, and the Wi-Fi 6E band has channels in the frequency range of 5945 MHz-7125 MHz and therefore the filter will be adjusted to its maximum frequency range, i.e., 5945-7125 MHz. For bands which have a narrower frequency range, for example 6 GHz licensed EU (n104), the adjustable filter 603$d$ can be tuned such that the tuneable filter corner frequency is 6425 MHz, resulting in a passband of 6425-7125 MHz. This results in a further improved coexistence between the licensed EU 6 GHz band and 5 GHz Wi-Fi and C-V2X.

The tuneable filter in the arrangement of FIGS. 6A and 6B enables the passband to extend to the whole of a licensed or unlicensed band's range which enables a filter to be certifiable for different jurisdiction.

It will be appreciated that although FIG. 6B shows the 5 GHz band filter(s) and the 6 GHz band filter(s) being connected to the same module, they may instead be connected to separate modules.

Figure 7B:
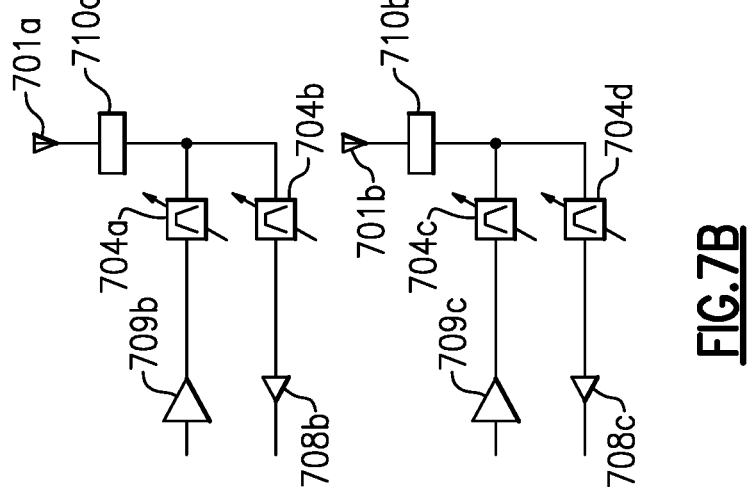
FIG. 7B is a schematic diagram of an antenna and filter configuration according to aspects of the present disclosure.
Figure 7A:
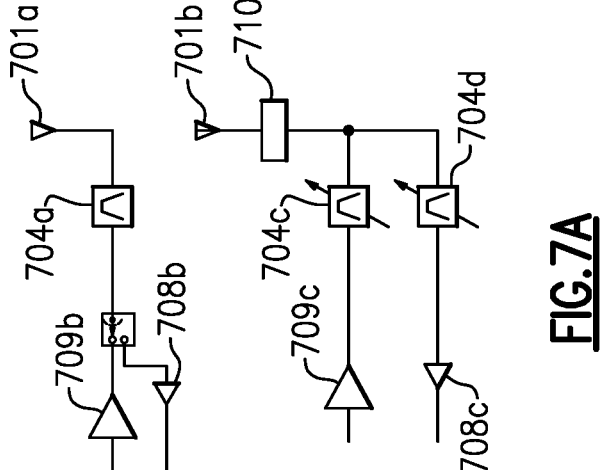
FIG. 7A is a schematic diagram of an antenna and filter configuration according to aspects of the present disclosure.

Although FIGS. 6A and 6B, and other figures described herein, show a single combined filter connected to both the transmit and receive paths, i.e., a single filter connected to the second antenna 601$b$, in another arrangement there may be a separate transmit filter 703$c$ and a separate receive filter 703$d$ connected to the second antenna 701$b$. This arrangement is shown in FIGS. 7A and 7B. It will be appreciated that although the arrangement will be described herein in relation to FIGS. 6A and 6B, the concept of providing a front-end arrangement comprising one or more separate transmit filters and one or more separate receive filters connected to one or more antenna ports may also be applied to any of the arrangements described in FIGS. 8A, 9A, 10A and 11A.

FIGS. 7A and 7B illustrate an antenna and filter arrangement, which is connected to the front-end module, as has been described in relation to other figures described herein, for example FIGS. 6A and 6B. Therefore, it will be understood that the low noise amplifiers 708$b$ and 708$c$ of FIGS. 7A and 7B will be connected to receive channels on the corresponding RFICs, and the power amplifiers 709$b$ and 709$c$ of FIGS. 7A and 7B will be connected to transmit channels on the corresponding RFICs, as described in relation to other figures herein.

As shown by FIGS. 7A and 7B, the combined transmit and receive filter 603$d$ described in FIGS. 6A and 6B, has been replaced by a separate transmit filter 703$c$ and a separate receive filter 703$d$. In the arrangement of FIG. 7B, the combined transmit and receive filter 603$c$ described in FIGS. 6A and 6B has also been replaced by a separate transmit filter 703$c$ and separate receive filter 703$d$.

In the arrangement of FIG. 7A, there is a combined transmit and receive filter 703$a$ which may have a passband of 5150-5925 MHz, as in filter 603$a$ of FIG. 6B. There is also separate transmit and receive filters 703$c$ and 703$d$ which may each have a passband of 5945-7125 MHz.

In the arrangement of FIG. 7B, the separate transmit and receive filters 703$a$ and 703$b$ may each have a passband of 5150-5925 MHz as in filter 603$a$ of FIG. 6B. The separate transmit and receive filters 703$c$ and 703$d$ of the arrangement in FIG. 7B may each have a passband of 5945-7125 MHz.

Therefore, the 6 GHz Wi-Fi path as shown in FIGS. 7A and 7B may be connected to separate receive 703$d$ and transmit filters 703$c$. The filters will be arranged in the front-end module in a similar way to that described in the single filter. For example, as shown in FIGS. 7A and 7B the separate transmit filters and the separate receive filters may be tuneable. The arrangements of FIGS. 7A and 7B are advantageous as the transmit and receive filters have different design considerations, and therefore their separation allows further optimisation, and therefore better results. For example, the receive filter 703$c$ has stronger out of band attenuation and lower loss than the transmit filter 703$d$, which affects the system performance even when there is no coexistence of C-V2X and other bands happening. For example, optimisation may not be required for the receive filter, but would be advantageous for the transmit filter which typically has higher loss than the receive filter. Therefore, able to adjust performance of the transmit or receive filters separately, allows optimisation. Furthermore, there may be cost and/or size savings achieved by using separate filters.

In this arrangement, both of the transmit and receive filters may be directly connected to an antenna switch module (ASM) 710. The transmit-receive switch 607$d$, described in FIGS. 6A and 6B, is not required and therefore is removed. Instead, the ASM 710 is used to switch in the transmit or receive filters and therefore paths, without the need for separate switches. The removal of the switch reduces loss in the arrangement.

As shown in FIGS. 7A and 7B, the separate transmit and receive filters may be tuneable, and have a tuneable filter corner frequency, as described in relation to FIGS. 6A and 6B. As described in relation to FIGS. 6A and 6B, the tuneable corner frequency may be varied based on different regional bands of licensed and unlicensed Wi-Fi, as well as cellular. It will be appreciated that the features of the tuneable single filter of FIGS. 6A and 6B may be the same for each of the separate transmit and receive filters of FIGS. 7A and 7B.

As described above, in addition to the separate transmit 703$c$ and receive filters 703$d$ which are connected to the second antenna 701$b$, the first antenna may either be connected to a combined transmit-receive filter 703$a$, as illustrated in FIG. 7A, or the first antenna 701$a$ may be connected to a separate transmit 703$a$ and a separate receive filter 703$b$, as shown in FIG. 7B. Therefore, in the arrangement of FIG. 7B, the front-end module comprises four filters. As described above, the transmit and receive filters are each directly connected to an ASM 710*a* or 710*b* which controls whether the transmit or receive filters are in use at each time. The transmit 703*a* and receive 703*b* filters connected to the first antenna 701*a* are both connected to an ASM 710*a*, and are separately controlled. The separate transmit and receive filters may either be fixed, i.e., non-tuneable, or they may be tuneable as shown in FIG. 7B. In an arrangement in which the filters are tuneable, the filters may have the same features as tuneable filters described herein. It will be appreciated that having tunability on transmit and receive of both the first and second path may be advantageous in some arrangements, as the interference of all of the paths may be reduced. However, it will be appreciated that the arrangement may comprise any combination of tuneable and non-tuneable filters for each of the transmit and receive paths for both the 5 GHz and 6 GHz bands.

It will be appreciated that in an arrangement comprising separate transmit and receive filters, the passband of the transmit filter may be different than the passband of the receive filter. This provides the ability for the receive filter to have a tuneable corner for the C-V2X receiver while not having a tuneable corner for the C-V2X transmitter or the 5 GHz or 6 GHz Wi-Fi transmitters. This provides protection for the C-V2X signal being received, by ensuring that there is no interference with the C-V2X receiver, as described herein. The C-V2X is a safety service, and therefore ensuring that nothing is encroaching on its receiving is an important aspect of the arrangements descried herein. Whereas it is not as important to protect the C-V2X or Wi-Fi receiver of Wi-Fi transmitters, and therefore the system may be improved by solely tuning the C-V2X receiver. This is advantageous in circumstances in which a low cost is required, and it is decided that the possibility of other bands, such as Wi-Fi, being affected by an untuned C-V2X transmitter is not as important as reduced costs. Furthermore, it will be appreciated that tuning the GHz and 6 GHz transmitters provides additional protection compared to tuning the 5 GHz and 6 GHz receivers. The ability to tune the transmitters results in less overlap with the C-V2X band, and thus avoids interference with the C-V2X receiver.

The minimum performance of the front-end module comprising a tuneable filter is set by the tuneable receive paths. The signals received within band of the tuneable filter are uninterrupted by other signals, as they are able to be tuned. Therefore, these signals are not degraded, and therefore provide the minimum performance. If the non-tuneable receive paths perform well, this will increase and improve the diversity gain of the system, and smaller amplitude signals are able to be received. However, if the non-tuneable receive paths are degraded by interference, they do not negatively impact the overall system, as the minimum performance is still achieved by the tuneable receive paths.

Figures 8A, 8B:
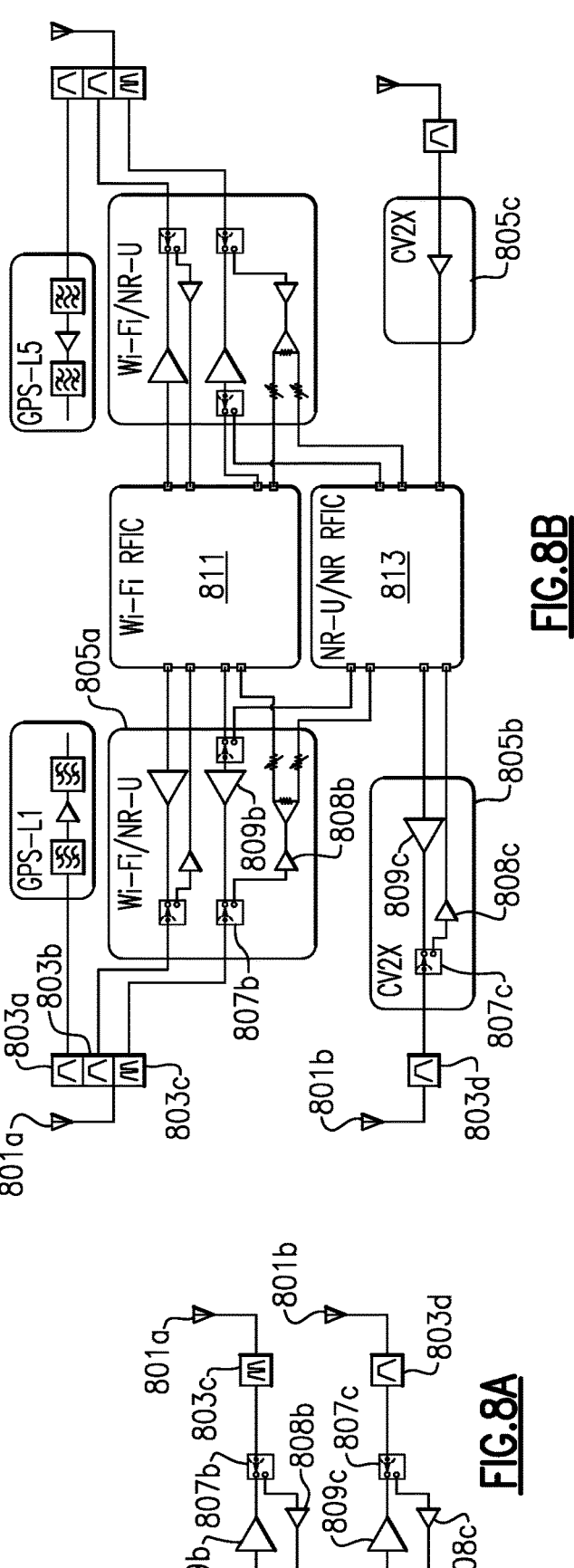
FIG. 8A is a schematic diagram of an antenna and filter configuration according to aspects of the present disclosure.
FIG. 8B is a schematic diagram of a radio frequency system include a front-end module and the antenna and filter configuration of FIG. 8A.

FIGS. 8A and 8B illustrate a third arrangement of an RF front-end. FIG. 8A illustrates the switch and filter arrangement of the RF front-end. FIG. 8B shows the RF front-end in an RF system. As shown, the RF front-end comprises two antenna ports, 801*a* and 801*b*. The RF front-end comprises a first module 805*a* for the Wi-Fi and NR-U signals, which is connected to a first filter 803*c*. The system further comprises a second module 805*b* for the transportation bands, which is connected to a second filter 803*d*. It will be appreciated that although referred to herein in relation to C-V2X bands, the concepts in the present application may be for any transportation band, such as Dedicated short-range communications (DSRC).

The first antenna, 801*a*, is connected to a first filter 803*c*. The first filter 803*c* is a notch filter. The first filter 803*c* may have a passband of 5150-7125 MHz and a stop-band of 5835-5945 MHz. Therefore, frequencies between below 5150 MHz, and above 7125 MHz do not pass through the filter 803*c*. Furthermore, frequencies between 5835 and 5945 MHz do not pass through the filter 803*c*. The notch filter 803*c* may have corner tunability, such that the filter 803*c* is tuneable, i.e., adjustable. The corners may be tuned such that the filter has a stopband of 5855 MHz to 5925 MHz. The stopband has a frequency such that the n47, i.e., C-V2X, band does not pass through the filter 803*c*. The stopband is narrow so that it rejects noise which is close to the frequency of the C-V2X band.

The notch filter 803*c* allows signals from the 5 GHz and 6 GHz bands through, such that the notch filter 803*c* is connected to the 5 GHz and 6 GHz Wi-Fi inputs and outputs of the Wi-Fi transceiver 811, as described in other arrangements herein. The notch filter 803*c* is also connected to the 5 GHz and 6 GHz NR-U inputs and outputs on the NR-U/NR transceiver 813. The filter may be connected to each input via power amplifiers and switches, as described in relation to FIGS. 4 to 6. Furthermore, the filter may be connected to each output via low-noise amplifiers, switches and post-LNA splitters, as described in relation to FIGS. 4 to 6. However, it will be appreciated that the filters may be connected to the transceivers in any suitable way.

The second antenna port 801*b* is connected to a bandpass filter 803*d*, wherein the passband of the filter 803*d* corresponds to the frequency range of transportation bands such as n47, i.e., C-V2X, or DSRC bands. The passband of the filter 803*d* may correspond to, or be narrower than, the stopband of the notch filter 803*c*. Therefore, some or all of the signals which are within the stopband of the notch filter 803*c*, and are therefore attenuated, pass through the bandpass filter 803*d*. As the notch filter 803*c* has a narrow stopband which is the same as, or slightly wider, than transportation band of interest, the majority of noise adjacent the transportation band is filtered out by the notch filter 803*c*.

As shown in FIGS. 8A and 8B, the filter 803*d* is connected to a separate module than the filter 803*c*. Therefore, the transportation bands, e.g., C-V2X bands, have their own separate paths which connect the filter to the NR-U/NR transceiver.

As illustrated in FIG. 8B, the RF system comprises two C-V2X modules 805*b* and 805*c*, one of which comprises a receiver and no transmitter 805*c*, and the other comprises a receiver and a transmitter 805*b*.

In the C-V2X module comprising a receiver and a transmitter 805*b*, the filter 803*d* is connected to a transmit-receive switch 807*c* which connects the filter 803*d* to a power amplifier 809*c* and a low-noise amplifier 808*c*. The power amplifier 809*c* is connected to an output on the NR-U/NR transceiver 813, and the low-noise amplifier 808*c* is connected to an input on the NR-U/NR transceiver.

The stopband of the notch filter 803*c* is sufficiently narrow that the notch filter enables n46 and 5 GHz to pass through the filter 803*c* at lower frequencies than the stopband. The stopband is also sufficiently narrow that the notch filter enables n96 and 6 GHz Wi-Fi operation at higher frequencies than the stopband. The ability to tune the notch provides separation between the transportation bands, and Wi-Fi and unlicensed bands which are not attenuated by the notch filter 803*c*. The transportation bands, such as C-V2X, are therefore protected from interference and noise. Therefore, it is possible for coexistence between the transportation bands, and 5 GHz Wi-Fi/NR-U and coexistence between the transportation bands, and 6 GHz Wi-Fi/NR-U. Although it will be appreciated that such coexistence partly depends on filter performance, antenna isolation, channel bandwidth, and channel proximity of the aggressor, e.g., Wi-Fi or NR-U, to the transportation band. It will also be appreciated that the tunability of the corner of the stopband results in the stopband being able to be varied depending on the region and certification requirements of particular licensed bands.

Figures 9A, 9B:
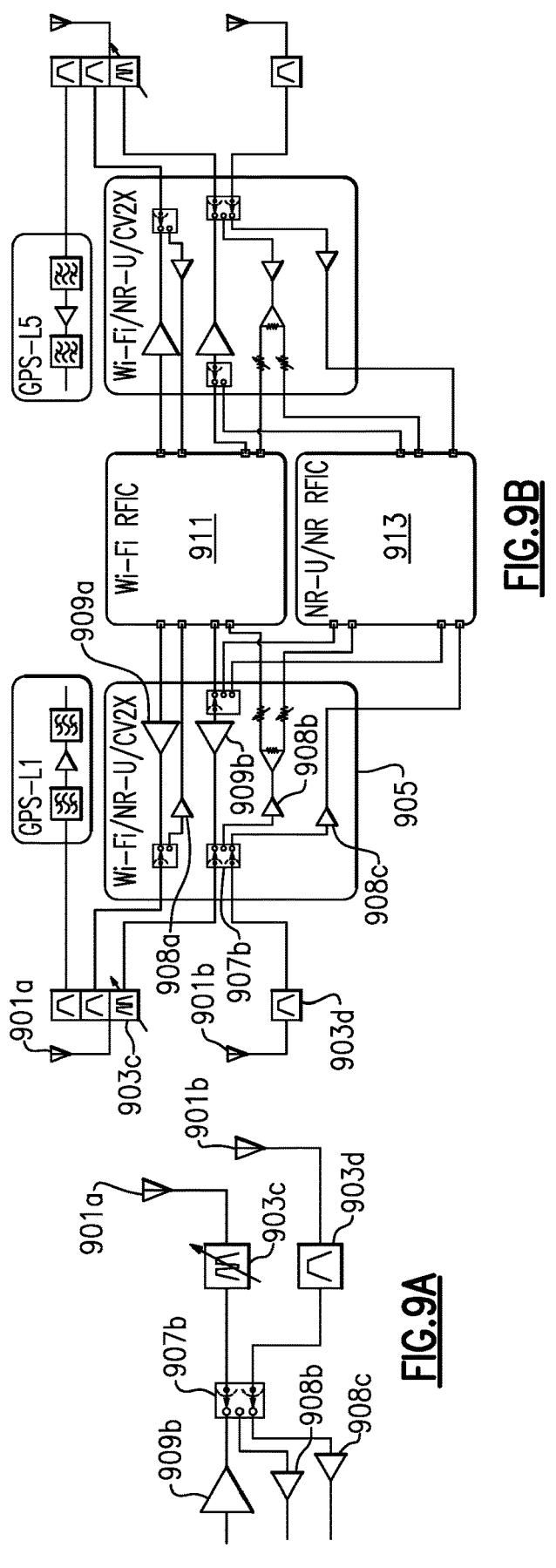
FIG. 9A is a schematic diagram of an antenna and filter configuration according to aspects of the present disclosure.
FIG. 9B is a schematic diagram of a radio frequency system include a front-end module and the antenna and filter configuration of FIG. 9A.

FIGS. 9A and 9B illustrate a fourth arrangement of an RF front-end. FIG. 9A illustrates the switch and filter arrangement of the RF front-end. FIG. 9B shows the RF front-end in an RF system.

As shown, the RF front-end of FIGS. 9A and 9B comprises two antenna ports, 901a and 901b. The system comprises a single module 905 for the Wi-Fi, NR-U signals and transportation signals. The RF front-end comprises a first filter 903c forming a signal path with the first antenna port 901a. The RF front-end further comprises a second filter 903d forming a signal path with the second antenna port 901b. The first filter 903c is an adjustable notch filter, such that the notch may be switchable, such that the notch may be switched on or off. It will be appreciated that in the case in which the notch is switched off, the first filter 903c is a bandpass filter. However, for clarity of reference we will refer to the filter herein as a notch filter, wherein the notch is switched off.

The first filter 903c may have a passband of 5150-7125 MHz and a stop-band of 5835-5945 MHz. Therefore, frequencies between below 5150 MHz, and above 7125 MHz do not pass through the filter 903c. Furthermore, frequencies between 5835 and 5945 MHz do not pass through the filter 803c. The notch filter 903c may have corner tunability, such that the filter 903c is tuneable, i.e., adjustable. The corners may be tuned such that the filter has a stopband of 5855 MHz to 5925 MHz. The corner tunability aspect is as described in other arrangements herein, such as in FIGS. 8A and 8B, and provides the advantages as discussed in relation to those figures. The stopband has a frequency such that the n47, i.e., C-V2X, band does not pass through the filter 903c. The stopband is narrow so that it rejects noise which is close to the frequency of the C-V2X band.

The notch filter 903c allows signals from the 5 GHz and 6 GHz bands through, such that the notch filter 903c is connected to the 5 GHz and 6 GHz Wi-Fi inputs and outputs of the Wi-Fi transceiver 911, as described in other arrangements herein. The notch filter 903c is also connected to the 5 GHz and 6 GHz NR-U inputs and outputs on the NR-U/ NR transceiver 913. The notch filter 903c is also connected to the 5.9 GHz input and output on the NR-U/NR transceiver, which transmit and receive the transportation bands. Therefore, when the notch is switched off, and all signals from 5150 to 7125 MHz, pass through the filter 903c, the transportation bands which pass through the filter 903c can travel from the first antenna port 901a to the input on the transceiver, or travel from the output on the transceiver to the first antenna port 901a. It will be appreciated that the present arrangement is suitable for any transportation band, such as Dedicated short-range communications (DSRC), and C-V2X.

The second antenna port 901b is connected to a band pass filter 903d, wherein the passband of the filter 903d corresponds to the frequency range of transportation bands such as n47, i.e., C-V2X, or DSRC bands. The band pass filter 903d has a passband within the stopband of the first filer 903c. The passband may correspond to, or be narrower than the stopband of the notch filter 903c. For example, the passband of the filter 903d may be 5855-5925 MHz. Therefore, when the notch of the notch filter 90c is switched on, some or all of the signals which are within the stopband of the notch filter 903c, pass through the passband filter 903d. As the notch filter 903c has a narrow stopband which is the same as, or slightly wider, than the transportation band of interest, the majority of noise adjacent the transportation band is filtered out by the notch filter 903c.

The first filter 903c and second filter 903d are connectable to a power amplifier 909b via a switch 907b, such that the power amplifier 909b is shared between the 5 GHz and 6 GHz bands, and the transportation bands. In other words, the switch is configured such that the power amplifier may be connected to either or none of the two filters 903c and 903d at any one time. Therefore, it is not possible for the RF front-end to transmit Wi-Fi and C-V2X simultaneously. This enables a compressed circuitry compared to other arrangements described herein. Therefore, this arrangement has fewer components, which lowers the cost and reduces the size of the RF system, which may be beneficial in some uses. The switching off of the notch in the notch filter 903c, when transportation signals are not to be transmitted, improves performance of the front-end module, and insertion loss is reduced without the notch turned on.

The RF front-end comprises two low noise amplifiers, 908b and 908c. The first low noise amplifier 908b is connected to the 5 GHz and 6 GHz Wi-Fi input on the Wi-Fi transceiver, and is also connected to the 5 GHz and 6 GHz NR-U input on the NR-U and NR transceiver, by use of a post-LNA splitter, as described in other arrangements herein.

The second low noise amplifier 908c is connected to the 5.9 GHz input on the NR-U/NR transceiver, such that the second low noise amplifier 908c processes transportation band signals, and the transportation band receiver has a separate low noise amplifier to the Wi-Fi and unlicensed radio bands. The first low noise amplifier can be connected to one of the first 903c and second 903d filters, through switch 907b, and the second low noise amplifier can be connected to one of the first and second filters through switch 907b. The switch 907b is configured such that the two low noise amplifiers may not be connected to the same filter at the same time.

Therefore, due to the separate low noise amplifiers, 908b and 908c, in the arrangement shown in FIGS. 9A and 9B, C-V2X and Wi-Fi/NR-U bands may be received simultaneously.

There are four different modes of operation to consider using the two paths, and adjustable notch filter arrangement shown in FIGS. 9A and 9B.

Firstly, Wi-Fi may be transmitting and C-V2X may be receiving. In this operation, the notch is switched on to protect the C-V2X band form interference with the Wi-Fi transmitter. The Wi-Fi would be operating through the first filter 903c, and the C-V2X operating through the second filter 903d.

Secondly, the Wi-Fi and C-V2X may both be transmitting. It is not possible for this transmission to happen simultaneously, as the low noise amplifier is shared between the two bands. Therefore, the Wi-Fi transmission must either be delayed or blanked, to give C-V2X priority, as it is the more important band to allow through, as it is a safety service.

Thirdly, the Wi-Fi may be receiving and the C-V2X transmitting. This is possible as the Wi-Fi receiving uses the first low noise amplifier 908b, and the C-V2X transmission uses the power amplifier. In this arrangement the notch may either be switched on or off. It may be preferable to enable the notch to protect the Wi-Fi receiver from interference from the C-V2X transmission by requiring that the C-V2X is transmitted between 5855-5925 MHz which has a 20 MHz separation from the frequencies which are allowed through the first filter 903c.

Lastly, both Wi-Fi and C-V2X may be receiving, as there are two receive paths, each comprising a separate low noise amplifier. This allows concurrent, i.e., simultaneous, receiving of the two bands. In this arrangement the notch in the first filter may either be switched on or off. It may be preferable to switch the notch off to reduce insertion loss and improve the performance of the RF front-end. There is no protection required as no bands are being received, and therefore nothing in front-end module, or device in which the RF front-end is located will interfere with the transmission of the bands.

Figures 10A, 10B:
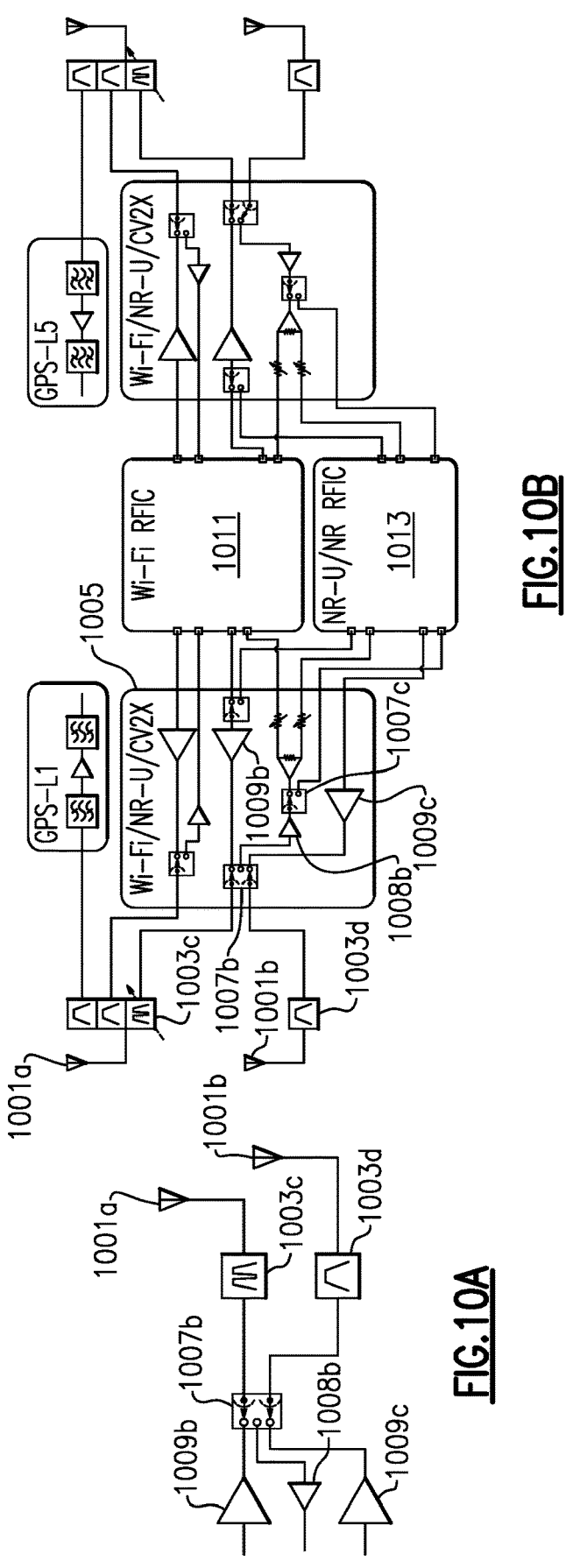
FIG. 10A is a schematic diagram of an antenna and filter configuration according to aspects of the present disclosure.
FIG. 10B is a schematic diagram of a radio frequency system include a front-end module and the antenna and filter configuration of FIG. 10A.

FIGS. 10A and 10B illustrate a fifth arrangement. FIG. 10A illustrates the switch and filter arrangements of an RF front-end. FIG. 10B shows a RF front-end in an RF system.

The arrangement as shown in FIGS. 10A and 10B comprises a first antenna port 1001a connected to a notch filter 1003c and a second antenna port 1001b connected to a notch filter 1003d, where each component is has the same features, uses and advantages as those described in FIGS. 9A and 9B.

As described in FIGS. 9A and 9B, the filter 1003c in the arrangement of FIGS. 10A and 10B is a notch filter, wherein the notch may be switched on or off. As described in FIGS. 9A and 9B, the second filter 1003d is a bandpass filter with a passband within the stopband of the notch filter 1003c.

The first filter 1003c and second filter 1003d are connectable to a shared low noise amplifier 1008b via a switch 1007b, such that the low noise amplifier 1008b is shared between the GHz and 6 GHz bands, and the transportation bands. Therefore, it is not possible for the RF front-end to receive Wi-Fi and C-V2X simultaneously. This enables a compressed circuitry compared to other arrangements described herein. Therefore, this arrangement has fewer components, which lowers the cost and reduces the size of the RF front-end, which may be beneficial in some uses. The switching off of the notch in the notch filter 1003c, when transportation signals are not being transmitted improves performance of the RF front-end, and insertion loss is reduced without the notch turned on.

The first filter 1003c is connectable to a first power amplifier 1009b by a switch 1007b, where the first power amplifier is connected to 5 GHz/6 GHz outputs on the Wi-Fi transceiver 1011 and NR-U/NR transceiver 1013. The first power amplifier is used for transmitting 5 GHz and 6 GHz Wi-Fi and NR-U bands. The first filter 1003c is also connectable to a second power amplifier 1009c which is connected to the 5.9 GHz output on the NR-U/NR transceiver. The second power amplifier is used for transmitting signals in the transportation band, such as C-V2X or DSRC bands. Therefore, the Wi-Fi/NR-U bands have a separate power amplifier, 1009b, to the power amplifier, 1009c, of the transportation bands. This results in the transportation band transmission being protected from interference. Due to the separate power amplifiers 1009b and 1009c, simultaneous transmission of Wi-Fi/NR-U is possible, as the switch 1007b is able to close two parallel connections simultaneously. Therefore, in both the case of the notch being switched on and the case of the notch being switched off, simultaneous transmission of signals within the transport band, and the 5 GHz/6 GHz Wi-Fi/NR-U bands is possible C-V2X The notch may be turned on or off when both are transmitting.

This may depend on whether there are other isolation/linearity related concerns. The second filter 1003c is also connectable to the first or second power amplifiers via the switch 1007b. Such that the second filter may be connected to the first power amplifier, or may be connected to the second power amplifier by the switch 1007b.

In the arrangement shown in FIGS. 10A and 10B, as described above, both Wi-Fi and C-V2X may be transmitted simultaneously with the notch either on or off.

In this arrangement it is also possible for one of Wi-Fi or C-V2X to be transmitting, and the other of Wi-Fi or C-V2X to be receiving. In this arrangement the notch is switched on to protect the C-V2X receiver or transceiver from interference. However, as described above, both C-V2X and Wi-Fi cannot be received simultaneously. Instead, Wi-Fi signals must be blanked to allow the receiving of the C-V2X signal.

The arrangement of FIGS. 10A and 10B provides the advantage of reducing cost and circuitry, without negatively impacting the receiving or transmitting of C-V2X signals.

Figures 11A, 11B:
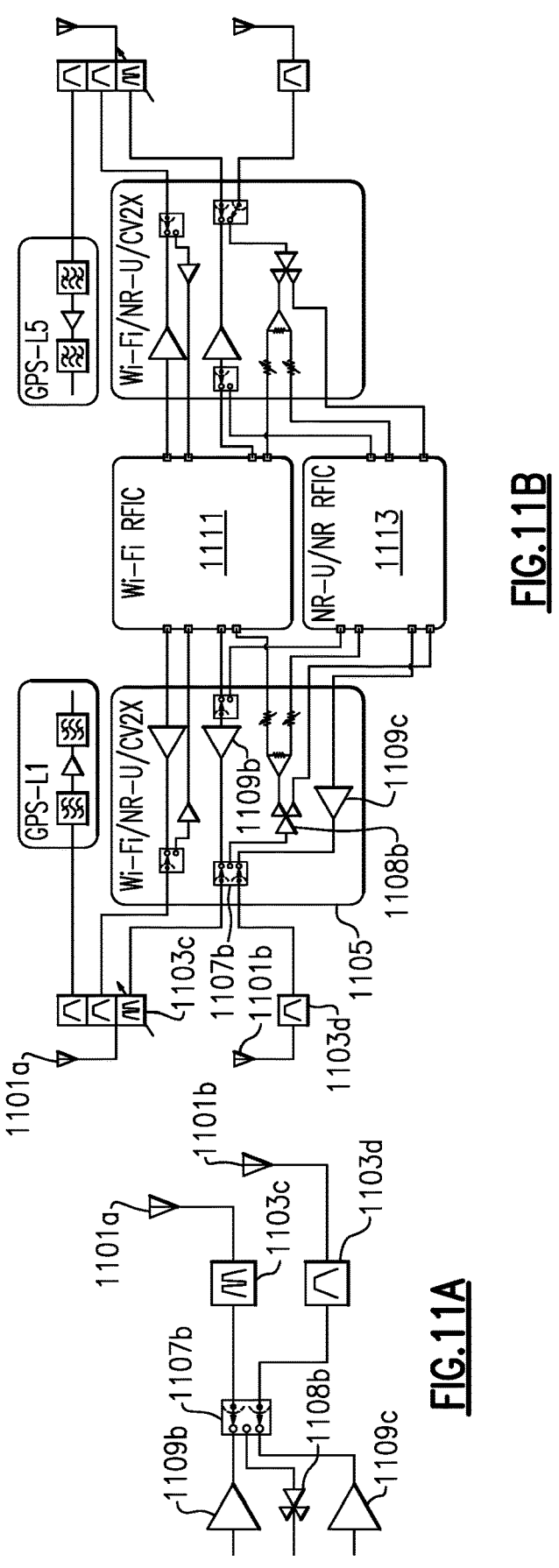
FIG. 11A is a schematic diagram of an antenna and filter configuration according to aspects of the present disclosure.
FIG. 11B is a schematic diagram of a radio frequency system include a front-end module and the antenna and filter configuration of FIG. 11A.

FIGS. 11A and 11B illustrate a sixth arrangement of an RF front-end. FIG. 11A illustrates the switch and filter arrangement of the RF front-end. FIG. 11B shows the RF front-end in an RF system.

The arrangement as shown in FIGS. 11A and 11B comprises a first antenna port 1101a connected to a notch filter 1103c and a second antenna port 1101b connected to a notch filter 1103d. The RF front-end also comprises a bandpass filter 1103b, where the passband of the bandpass filter is within the stopband of the notch filter 1103c. Each component has the same features, uses and advantages as those described in FIGS. 9A and 9B and FIGS. 10A and 10B. It will be appreciated that the arrangement of FIGS. 11A and 11B is exactly the same as that described in FIGS. 10A and 10B, except for the difference now described.

The arrangement differs from that described in relation to FIGS. 10A and 10B in that the low noise amplifier, 1108b is an active splitter low noise amplifier. The first filter is connectable to a first power amplifier 1109b and a second power amplifier 1109c by a switch 1107b, as described in relation to FIGS. 10A and 10B. The second filter is connectable to the first power amplifier 1109b and the second power amplifier 1109c by a switch 1107b, as described in relation to FIGS. 10A and 10B. The switch is configured such that simultaneous transmission of Wi-Fi/NR-U is possible due to the two power amplifiers, and the switch 1107b being able to close two parallel connections simultaneously. As described in relation to FIGS. 10A and 10B, the first power amplifier 1109b is connected to 5 GHz and 6 GHz outputs on the Wi-Fi 1111 and NR-U/NR transceivers 1113. The second power amplifier 1109c is connected to 5.9 GHz output on the NR-U/NR transceiver 1113, thus the transportation signals pass through the second power amplifier 1109c.

The first filter 1103c and second filter 1103d are connectable to a shared low noise amplifier 1108b via a switch 1107b, such that the low noise amplifier 1108b is shared between the GHz and 6 GHz bands, and the transportation bands. Therefore, it is not possible for the front-end module 1105 to receive Wi-Fi and C-V2X simultaneously. As in other arrangements described herein, the low noise amplifier 1108b is connected to the C-V2X, 5/6 GHz Wi-Fi and 5/6 GHz NR-U inputs on the respective transceivers. However, as shown in FIG. 11B, this arrangement differs from the arrangement of FIGS. 10A and 10B as the low noise amplifier 1108b is an active splitting LNA, resulting in two paths being formed by the low noise amplifier 1108b. The first of these paths is connected to the 5.9 GHz input on the transceiver. The second of these paths splits into two paths, one connected to the 5 GHz/6 GHz Wi-Fi input on the transceiver, and the second of these paths is connected to the 5 GHz/6 GHz NR-U input on the transceiver. Therefore, the arrangement comprises a shared low noise amplifier 1108*b*, which has two outlets. The active splitting of the LNA also involves independent and separate gain control. This enables the RF front-end to receive Wi-Fi/NR-U and C-V2X simultaneously. As described in other arrangements herein, the notch filter 1103*c* may have an adjustable stopband, such that the notch may be switched on or off, or the stopband of the notch filter 1103*c* may be tuned. This enables the notch to be switched off when not required, which reduces insertion loss. It will also be appreciated that the tunability of the corner of the stopband results in the stopband being able to be varied depending on the region and certification requirements of particular licensed bands. This allows the RF front-end to be reconfigured for different uses, such as for different regions.

It will be appreciated that the adjustable passband and/or adjustable, switched or tuneable notch filters described in any of the arrangements herein may be modified during the adjusting, tuning and/or switching as described herein. The filters described herein may be any suitable filters. For example, the filter may be individual series resonators, shunt resonators or combinations of both. The types of resonators or combinations of resonators may be modified during the adjusting, tuning and/or switching as described herein. For example, one resonator may be switched in to adjust the notch, or a series of resonators may be switched in to adjust the notch. Any of the filters described herein may be any or all of electronically adjustable, electrically tuneable and electrically switchable. Additionally, or alternatively, any of the filters described herein filters may be any or all of manually adjustable, manually tuneable and manually switchable.

Figure 12:
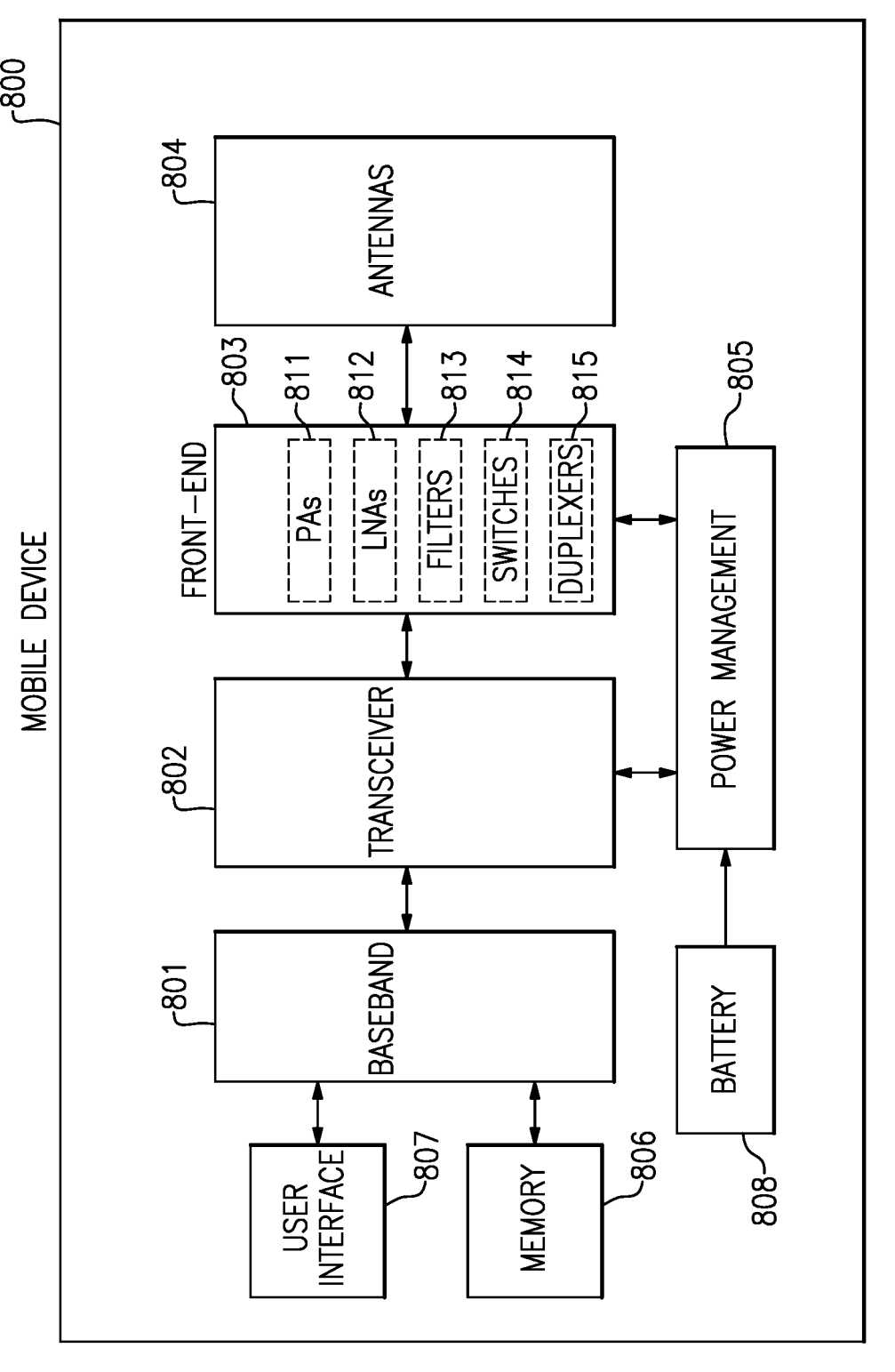
FIG. 12 is a schematic diagram of one embodiment of a mobile device.

FIG. 12 is a schematic diagram of one embodiment of a mobile device 800. The mobile device 800 includes a baseband system 801, a transceiver 802, a front-end circuit 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 12 as the transceiver 802. In one example, separate components (for instance, separate circuits or dies) can be provided for handling certain types of RF signals.

The front-end circuit 803 aids in conditioning signals transmitted to and/or received from the antennas 804. In the illustrated embodiment, the front-end circuit 803 includes power amplifiers (PAs) 811, low noise amplifiers (LNAs) 812, filters 813, switches 814, and duplexers 815. However, other implementations are possible.

For example, the front-end circuit 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

The front-end circuit 803 can be implemented to include one or more radio frequency processing circuits with tunable filters in accordance with the teachings herein.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front-end circuit 803 can include phase shifters having variable phase controlled by the transceiver 802. Additionally, the phase shifters are controlled to provide beam formation and directivity for transmission and/or reception of signals using the antennas 804. For example, in the context of signal transmission, the phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 12, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 12, the power management system 805 receives a battery voltage from the battery 808. The battery 808 can be any suitable battery for use in the mobile device 800, including, for example, a lithium-ion battery.

It will therefore be appreciated that any of the arrangements described in this application result in a more efficient front-end module. The front-end modules discussed herein have fewer components, and therefore are smaller in size than conventional front-end modules. Therefore, the front-end modules described herein are advantageous for use in devices where space is a premium, such as in watches, headsets, mobile phones, and others. In the arrangements described herein, the paths are consolidated into one and may be repurposed for multiple operation modes and use cases. This reduces cost as duplicated fixed frequency paths or dedicated frequency paths have been replaced for some frequency bands.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

It is to be appreciated that embodiments of the methods and apparatuses discussed herein are not limited in application to the details of construction and the arrangement of components set forth in the following description or illustrated in the accompanying drawings. The above detailed description of certain embodiments is not intended to be exhaustive or to limit the invention to the precise form disclosed above. The methods and apparatuses are capable of implementation in other embodiments and of being practiced or of being carried out in various ways. Accordingly, the examples of specific implementations provided herein are for illustrative purposes only and are not intended to be limiting. While specific embodiments of, and examples for, the invention are described above for illustrative purposes, various equivalent modifications are possible within the scope of the invention, as those ordinary skilled in the relevant art will recognize in view of the disclosure herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The words "coupled" or connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The teachings of the invention provided herein can be applied to other systems, not necessarily the systems described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions, and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A front-end module comprising:
a first antenna port and a second antenna port;
a first filter forming a first signal path with the first antenna port;
a second filter forming a second signal path with the second antenna port, the first or second filter being an adjustable filter; and
a plurality of transceivers including a first transceiver and a second transceiver, the first transceiver being coupled to a first switching device, the first switching device being configured to selectively couple the first transceiver to one of the first signal path or second signal path, and the second transceiver being coupled to a second switching device, the second switching device being configured to selectively couple the second transceiver to one of the first signal path or second signal path.

2. The front-end module of claim 1 wherein the first filter is a bandpass filter and the second filter is a tunable bandpass filter.

3. The front-end module of claim 2 wherein the bandpass filter has a passband configured to pass transportation channels.

4. The front-end module of claim 1 wherein the first filter is a notch filter having a stop-band and a pass-band.

5. The front-end module of claim 4 wherein the notch filter is configured to be tuned and can be switched on or off.

6. The front-end module of claim 4 wherein the second filter is a bandpass filter having a passband within the stop-band of the notch filter and wherein the bandpass filter has a passband configured to pass transportation channels.

7. The front-end module of claim 6 wherein the bandpass filter has a passband of 5855-5925 Mhz.

8. The front-end module of claim 1 wherein the adjustable filter is one of manually adjusted or electronically adjusted.

9. The front-end module of claim 1 further comprising a first power amplifier, wherein the first power amplifier is connected to the first and second signal paths via a switch.

10. The front-end module of claim 1 further comprising a first power amplifier and a second power amplifier, wherein the first power amplifier is connected to the first signal path, and the second power amplifier is connected to the second signal path.

11. The front-end module of claim 1 further comprising a first power amplifier and a second power amplifier, wherein the first and second signal paths are each connectable to at least one of the first and second power amplifiers.

12. The front-end module of claim 1 further comprising a first power amplifier and a second power amplifier, wherein each of the first and second signal paths are connectable to either the first or second power amplifiers and wherein the second power amplifier is configured to transmit transportation band signals.

13. The front-end module of claim 1 further comprising a first low-noise amplifier, wherein the first low-noise amplifier is connectable to either the first or second filter.

14. The front-end module of claim 13 wherein the first low-noise amplifier is an active splitter low noise amplifier.

15. The front-end module of claim 13 further comprising a second low-noise amplifier, wherein the first low-noise amplifier is connected to the first filter, and the second low-noise amplifier is connected to the second filter.

16. The front-end module of claim 13 further comprising a second low-noise amplifier, wherein the first and second low-noise amplifiers are each connectable to either the first or second filters.

17. The front-end module of claim 16 wherein the second low-noise amplifier is configured to process transportation band signals.

18. The front-end module of claim 1 further comprising a third filter forming a third signal path with the second antenna port, wherein the second filter is a receive filter and the third filter is a transmit filter, wherein the second and third filters are connected to an antenna switch module, the antenna switch module being connected to the second antenna port, and wherein the second and third filters are tunable filters.

19. A wireless device comprising:
a first antenna;
a second antenna;
a radio-frequency module, the radio-frequency module including a front-end configuration comprising:
a first antenna port coupled to the first antenna;
a second antenna port coupled to the second antenna;
a first filter forming a first signal path with the first antenna port; and
a second filter forming a second signal path with the second antenna port, the first or second filter being an adjustable filter, the first filter having a first passband and the second filter having a second passband, the first passband being separated from the second passband by at least 20 MHz.

20. The wireless device of claim 19 wherein the first filter is a bandpass filter and the second filter is a tunable bandpass filter.

* * * * *